US008860375B2

(12) United States Patent
Chen et al.

(10) Patent No.: US 8,860,375 B2
(45) Date of Patent: Oct. 14, 2014

(54) BACKUP BATTERY CHARGER

(75) Inventors: Yung-Ta Chen, New Taipei (TW);
Ching-Feng Hsieh, Taipei (TW)

(73) Assignees: Askey Technology (Jiangsu) Ltd. (CN);
Askey Computer Corp. (TW)

( * ) Notice: Subject to any disclaimer, the term of this patent is extended or adjusted under 35 U.S.C. 154(b) by 402 days.

(21) Appl. No.: 13/271,293

(22) Filed: Oct. 12, 2011

(65) Prior Publication Data

US 2013/0057217 A1    Mar. 7, 2013

(30) Foreign Application Priority Data

Sep. 2, 2011    (TW) .............................. 100131767 A

(51) Int. Cl.
*H02J 7/00*    (2006.01)
(52) U.S. Cl.
CPC ............ *H02J 7/0022* (2013.01); *H02J 7/0026* (2013.01)
USPC ........................................................ 320/134
(58) Field of Classification Search
USPC ........................................................ 320/134
See application file for complete search history.

(56) References Cited

U.S. PATENT DOCUMENTS

| 5,847,912 | A  | * | 12/1998 | Smith et al. .................. 361/93.1 |
| 6,577,105 | B1 | * | 6/2003  | Iwaizono ...................... 320/134 |
| 7,605,568 | B2 | * | 10/2009 | Gangstoe et al. ............. 320/137 |
| 7,737,663 | B2 | * | 6/2010  | Sakurai et al. ................ 320/134 |
| 7,863,858 | B2 | * | 1/2011  | Gangstoe et al. ............. 320/106 |
| 7,948,212 | B2 | * | 5/2011  | Odaohhara ................... 320/150 |
| 8,212,525 | B2 | * | 7/2012  | Iwata ............................ 320/118 |
| 2009/0243539 | A1 | * | 10/2009 | Gangstoe et al. ............. 320/106 |

* cited by examiner

*Primary Examiner* — Edward Tso
*Assistant Examiner* — Ramy Ramadan
(74) *Attorney, Agent, or Firm* — Schmeiser, Olsen & Watts, LLP

(57) ABSTRACT

A backup battery charger charges a backup battery of a handheld electronic device. The handheld electronic device comprises a power supply unit and an electronic component. The power supply unit supplies a power to the electronic component. The backup battery charger is connected to the electronic component, such that the backup battery charger shares with the electronic component the power, uses the power as a charging power, and controllably determines via a control module whether to supply the charging power to the backup battery.

10 Claims, 2 Drawing Sheets

BACKUP BATTERY CHARGER

CROSS-REFERENCE TO RELATED APPLICATION

This non-provisional application claims priority under 35 U.S.C. §119(a) on Patent Application No(s). 100131767 filed in Taiwan, R.O.C. on Sep. 2, 2011, the entire contents of which are hereby incorporated by reference.

FIELD OF THE INVENTION

The present invention relates to chargers for backup batteries, and more particularly, to a backup battery charger for a handheld electronic device.

BACKGROUND OF THE INVENTION

Due to the prevalence of handheld electronic devices, such as smartphones and tablet PC, power supply is of vital importance. In addition to a main battery, a conventional handheld electronic device can be equipped with a backup battery for supplying the backup power required to shut down the handheld electronic device, store data therein, and prevent data loss which might otherwise occur while the main battery is being changed.

The conventional way of charging the backup battery entails charging the backup battery by a charging circuit (also known as a charger), such as a charging IC, which is different from the one usually used to charge the main battery. The conventional backup battery charger has its disadvantage, that is, it increases the required circuit area and incurs costs.

SUMMARY OF THE INVENTION

It is an objective of the present invention to provide a backup battery charger without increasing the required circuit area greatly and incurring costs.

In order to achieve the above and other objectives, the present invention provides a backup battery charger for charging a backup battery of a handheld electronic device. The handheld electronic device has a power supply unit and an electronic component. The power supply unit supplies a power to the electronic component. The backup battery charger comprises: a charging power input end connected to the electronic component for receiving the power and using the power thus received as a charging power; and a control module having a first signal receiving end for receiving an external interruption control signal and being connected between the charging power input end and the backup battery for transmitting the charging power to the backup battery and interrupting transmission of the charging power to the backup battery based on the external interruption control signal.

In an embodiment, the control module comprises an overcurrent protection control circuit, and the first signal receiving end cuts off the charging power passing through the overcurrent protection control circuit by using an overcurrent detection signal generated by an external overcurrent detection circuit and regarded as the interruption control signal. The control module further comprises a program control protection circuit having a second signal receiving end for receiving an external program control signal and being connected between the overcurrent protection control circuit and the backup battery for selectively turning on the program control protection circuit or cutting off the charging power passing through the program control protection circuit based on the external program control signal.

In an embodiment, the overcurrent protection control circuit comprises: a first transistor having a first input end connected to the charging power input end, a first control end connected to the first signal receiving end, and a first output end; a second transistor having a second input end connected to the first output end, a second control end connected to the first signal receiving end, and a second output end for supplying the charging power; and a first resistor having an end connected to the second input end and the first output end and another end connected to the second control end and the first control end to allow the overcurrent detection signal to turn off the first transistor and the second transistor and cut off the charging power passing through the overcurrent protection control circuit.

In an embodiment, the program control protection circuit comprises: a third transistor having a third control end connected to the second signal receiving end, a third output end for supplying the charging power, and a third input end; and a second resistor connected between the third input end and the second output end, such that the program control signal can controllably turn on or turn off the third transistor and thereby turn on the program control protection circuit or cut off the charging power passing through the program control protection circuit, respectively.

In an embodiment, the program control protection circuit will not cut off the charging power passing through the program control protection circuit unless and until the program control signal received at the second signal receiving end indicates that a main power of the handheld electronic device is of a low power level.

In an embodiment, a power accessed by the charging power input end is a power supplied to a USB port of the handheld electronic device.

In an embodiment, a power accessed by the charging power input end is of a voltage of 4V to 6V.

Accordingly, a backup battery charger of the present invention dispenses with a conventional charging IC, cuts costs greatly, has direct access to a converted power supplied to a handheld electronic device and thus prevents a power loss which might otherwise arise from a power conversion process performed by a typical charging IC, and thus supplies a stable charging power to a backup battery by means of a low current of the converted power and a low power loss.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
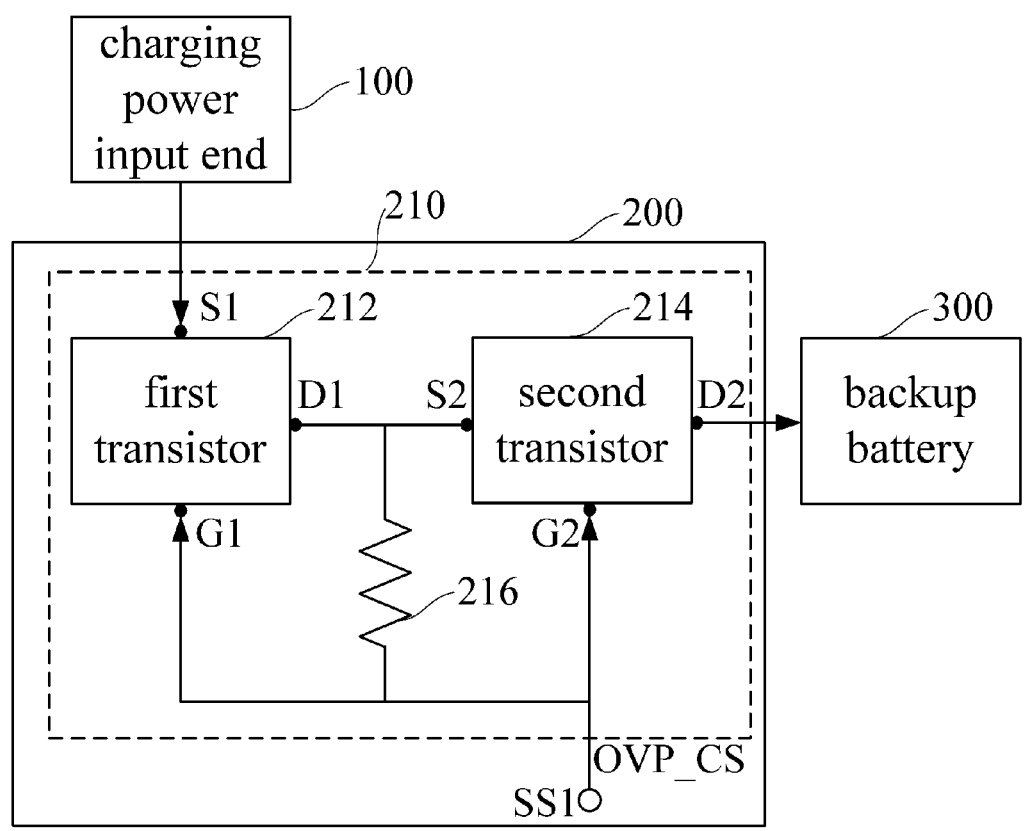
FIG. 1 is a schematic view of a backup battery charger according to the first embodiment of the present invention.

Referring to FIG. 1, there is shown a schematic view of a backup battery charger according to the first embodiment of the present invention. In the first embodiment, a backup battery charger comprises a charging power input end 100 and a control module 200. A typical handheld electronic device usually has a power supply unit and at least one electronic component. The power supply unit supplies power to the electronic component. The charging power input end 100 is connected to a power source of one of the electronic components in the handheld electronic device and thus shares with the connected electronic component the power supplied thereto. Hence, the charging power input end 100 and the electronic components share the power supplied by the power supply unit to the electronic components.

The handheld electronic device converts a main power, such as the power supplied to the main battery or an external power, into a plurality of sub-powers according to the power consumption specifications of the electronic components, and supplies the sub-powers to the electronic components, respectively. In an embodiment of the present invention, a backup battery charger has direct access to the sub-powers and uses one of the sub-powers as a charging power for charging a backup battery. For example, the sub-power accessed by the charging power input end can be a power supplied to a USB port of the handheld electronic device or one of the other sub-power of 4V to 6V, wherein using the power supplied to the USB port is conducive to the stability of the operation of the handheld electronic device.

Referring to FIG. 1, the control module 200 has a first signal receiving end SS1 and is connected between the charging power input end 100 and a backup battery 300 for transmitting the charging power to the backup battery 300 and interrupting the transmission of the charging power to the backup battery 300 as soon as the first signal receiving end SS1 receives an interruption control signal. In the embodiment shown in FIG. 1, the control module 200 comprises an overcurrent protection control circuit 210 connected between the charging power input end 100 and the backup battery 300, and the first signal receiving end SS1 cuts off the charging power passing through the overcurrent protection control circuit 210 by using an overcurrent detection signal OVP_CS generated by an external overcurrent detection circuit (not shown) and regarded as the interruption control signal. Normally, a battery of the handheld electronic device always has an overcharging or overdischarging protection circuit. The embodiments of the present invention employ a detection signal of the conventional protection circuit for exercising control.

In an embodiment, the overcurrent protection control circuit 210 comprises a first transistor 212, a second transistor 214, and a first resistor 216. The first transistor 212 has a first input end S1, a first control end G1, and a first output end D1. The first input end S1 is connected to the charging power input end 100. The first control end G1 is connected to the first signal receiving end SS1. The second transistor 214 has a second input end S2, a second control end G2, and a second output end D2. The second input end S2 is connected to the first output end D1. The second control end G2 is connected to the first signal receiving end SS1. The second output end D2 supplies a charging power. The first resistor 216 has one end connected to the second input end S2 and the first output end D1 and the other end connected to the second control end G2 and the first control end G1, such that the overcurrent detection signal OVP_CS can turn off the first transistor 212 and the second transistor 214 and thereby cut off the charging power passing through the overcurrent protection control circuit 210, thus forming across the transistors a bias voltage for turning off the transistors. The first transistor 212 and the second transistor 214 are PNP transistors or NPN transistors. Persons skilled in the art are able to understand the control exercised by a combination of the first resistor 216 and the transistors.

Figure 2:
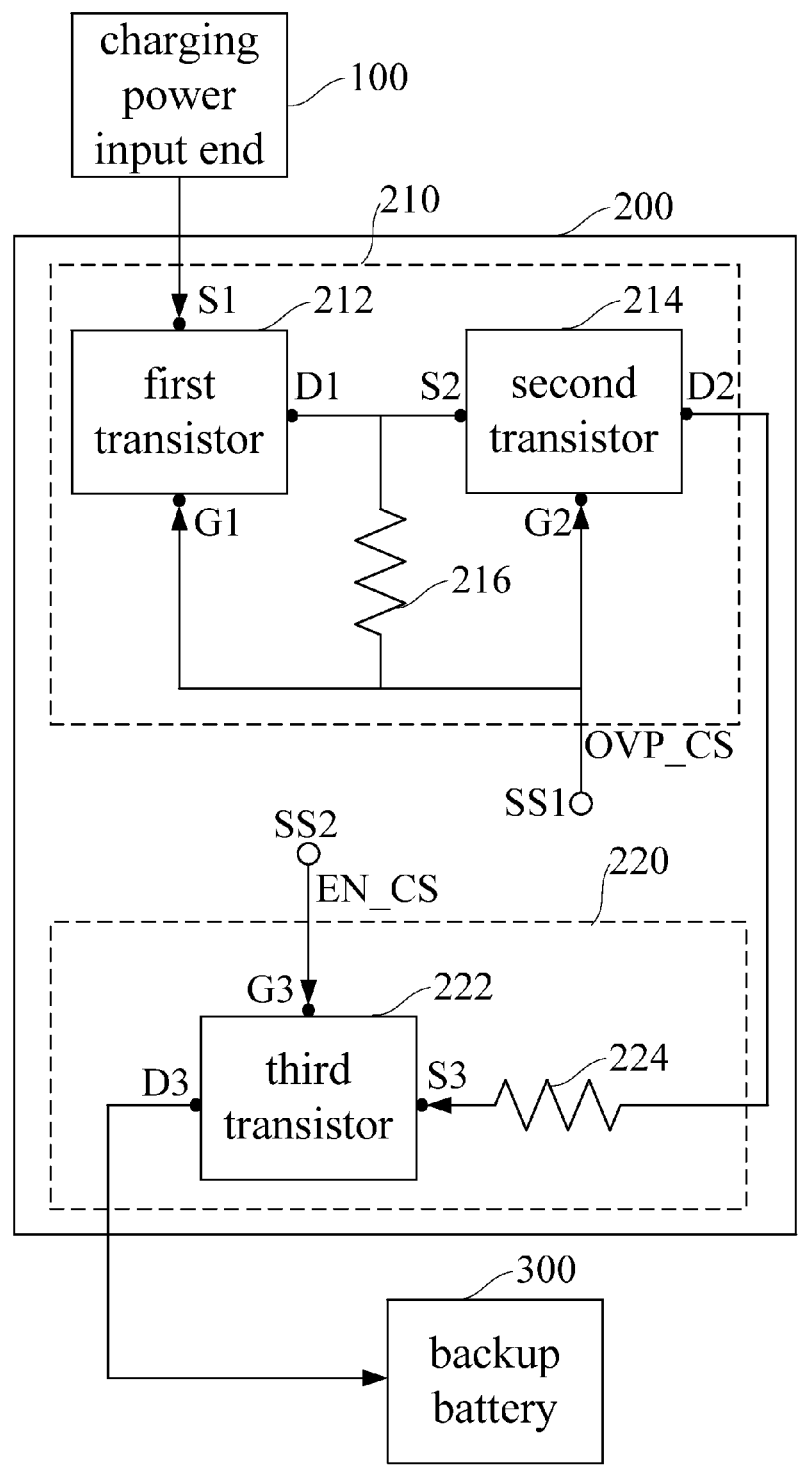
FIG. 2 is a schematic view of a backup battery charger according to the second embodiment of the present invention.

Referring to FIG. 2, there is shown a schematic view of a backup battery charger according to the second embodiment of the present invention. The control module 200 further comprises a program control protection circuit 220. The program control protection circuit 220 has a second signal receiving end SS2 and is connected between the overcurrent protection control circuit 210 and the backup battery 300. The second signal receiving end SS2 selectively turns on the program control protection circuit 220 or cuts off the charging power passing through the program control protection circuit 220 according to an external program control signal EN_CS. The protection mechanism is characterized in that the program control protection circuit 220 is instructed to stop charging the backup battery 300 whenever the handheld electronic device is not connected to any external power and the main power is of a low power level, so as to reduce the load of the main battery. Preferably, the program control signal EN_CS will not start to instruct the program control protection circuit 220 to cut off the charging power passing through the program control protection circuit 220 unless and until the main power of the handheld electronic device is of a low power level. Or, alternatively, the program control signal EN_CS will not instruct the program control protection circuit 220 to let the charging power pass through the program control protection circuit 220 unless and until the handheld electronic device is connected to an external power. The program control signal EN_CS is controlled by a programmable setting of the handheld electronic device.

In an embodiment, the program control protection circuit 220 comprises a third transistor 222 and a second resistor 224. The third transistor 222 has a third control end G3, a third output end S3, and a third input end D3. The third control end G3 is connected to the second signal receiving end SS2. The third output end D3 supplies the charging power. The second resistor 224 is connected between the third input end D3 and the second output end D2, such that the program control signal EN_CS can controllably turn on or turn off the third transistor 222 and thereby turn on the program control protection circuit 220 or cut off the charging power passing through the program control protection circuit 220, respectively.

In conclusion, in the embodiments of the present invention, simple components, such as transistors, share a sub-power with the electronic components in the handheld electronic device and are connected to various protection circuits to dispense with an additional charging IC, cut costs, minimize a power loss which might otherwise arise from a power conversion process performed by a typical charging IC, and thus supply a stable charging power to a backup battery.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A backup battery charger disposed in a handheld electronic device and configured to charge a backup battery in the handheld electronic device, the handheld electronic device having a power supply unit and an electronic component, the power supply unit supplying a power to the electronic component, the backup battery charger comprising:

a charging power input end connected to the electronic component for receiving the power and using the power thus received as a charging power; and a control module having a first signal receiving end for receiving an external interruption control signal and being connected between the charging power input end and the backup battery for transmitting the charging power to the backup battery and interrupting transmission of the charging power to the backup battery based on the external interruption control signal;

wherein the control module comprises an overcurrent protection control circuit, and the first signal receiving end cuts off the charging power passing through the overcurrent protection control circuit by using an overcurrent detection signal generated by an external overcurrent detection circuit and regarded as the interruption control signal.

2. The backup battery charger of claim 1, wherein the overcurrent protection control circuit comprises:
a first transistor having a first input end connected to the charging power input end, a first control end connected to the first signal receiving end, and a first output end;
a second transistor having a second input end connected to the first output end, a second control end connected to the first signal receiving end, and a second output end for supplying the charging power; and
a first resistor having an end connected to the second input end and the first output end and another end connected to the second control end and the first control end to allow the overcurrent detection signal to turn off the first transistor and the second transistor and cut off the charging power passing through the overcurrent protection control circuit.

3. The backup battery charger of claim 1, wherein the control module further comprises a program control protection circuit having a second signal receiving end for receiving an external program control signal and being connected between the overcurrent protection control circuit and the backup battery for selectively turning on the program control protection circuit or cutting off the charging power passing through the program control protection circuit based on the external program control signal.

4. The backup battery charger of claim 3, wherein the program control protection circuit does not cut off the charging power passing through the program control protection circuit unless and until the program control signal received at the second signal receiving end indicates that a main power of the handheld electronic device is of a low power level.

5. The backup battery charger of claim 2, wherein the control module further comprises a program control protection circuit having a second signal receiving end, and the program control protection circuit is connected between the overcurrent protection control circuit and the backup battery, such that the second signal receiving end selectively turns on the program control protection circuit or cuts off the charging power passing through the program control protection circuit based on an external program control signal.

6. The backup battery charger of claim 5, wherein the program control protection circuit does not cut off the charging power passing through the program control protection circuit unless and until the program control signal received at the second signal receiving end indicates that a main power of the handheld electronic device is of a low power level.

7. The backup battery charger of claim 5, wherein the program control protection circuit comprises:
a third transistor having a third control end connected to the second signal receiving end, a third output end for supplying the charging power, and a third input end; and
a second resistor connected between the third input end and the second output end, such that the program control signal can controllably turn on or turn off the third transistor and thereby turn on the program control protection circuit or cut off the charging power passing through the program control protection circuit, respectively.

8. The backup battery charger of claim 1, wherein a power accessed by the charging power input end is a power supplied to a USB port of the handheld electronic device.

9. The backup battery charger of claim 1, wherein a power accessed by the charging power input end is of a voltage of 4V to 6V.

10. A backup battery charger disposed in a handheld electronic device and adapted to charge a backup battery in the handheld electronic device, the handheld electronic device having a power supply unit and an electronic component, the power supply unit supplying a power to the electronic component, the backup battery charger comprising:
a charging power input end connected to the electronic component for receiving the power and using the power thus received as a charging power; and
a control module having a first signal receiving end for receiving an external interruption control signal, and comprising an overcurrent protection control circuit and a program control protection circuit,
wherein the overcurrent protection control circuit cuts off by the first signal receiving end the charging power passing through the overcurrent protection control circuit according to an overcurrent detection signal generated by an external overcurrent detection circuit and regarded as the interruption control signal,
wherein the program control protection circuit having a second signal receiving end for receiving an external program control signal and being connected between the overcurrent protection control circuit and the backup battery for selectively turning on the program control protection circuit or cutting off the charging power passing through the program control protection circuit based on the external program control signal,
wherein the control module is connected between the charging power input end and the backup battery for transmitting the charging power to the backup battery and interrupting transmission of the charging power to the backup battery based on the external interruption control signal, wherein the program control protection circuit does not cut off the charging power passing through the program control protection circuit unless and until the program control signal received at the second signal receiving end indicates that a main power of the handheld electronic device is of a low power level.

* * * * *